(12) United States Patent
Sesko

(10) Patent No.: US 7,791,712 B2
(45) Date of Patent: Sep. 7, 2010

(54) CHROMATIC CONFOCAL SENSOR FIBER INTERFACE

(75) Inventor: David William Sesko, Woodinville, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 561 days.

(21) Appl. No.: 11/691,744

(22) Filed: Mar. 27, 2007

(65) Prior Publication Data

US 2008/0239323 A1 Oct. 2, 2008

(51) Int. Cl.
*G01C 5/00* (2006.01)
(52) U.S. Cl. .......................... 356/3; 356/609; 356/614; 385/92; 385/33; 385/53; 385/84
(58) Field of Classification Search ...... 356/3, 356/609, 614; 385/92, 93, 33, 53, 60, 68, 385/78, 84
See application file for complete search history.

(56) References Cited

U.S. PATENT DOCUMENTS

| 4,585,349 | A | | 4/1986 | Gross |
| 4,824,202 | A | * | 4/1989 | Auras ........................ 385/93 |
| 5,719,977 | A | * | 2/1998 | Lampert et al. ............... 385/60 |
| 5,785,651 | A | | 7/1998 | Kuhn |
| 6,688,783 | B2 | | 2/2004 | Janosik |
| 2006/0109483 | A1 | | 5/2006 | Marx |

FOREIGN PATENT DOCUMENTS

DE 102006016229 A1 10/2007
WO 03/052342 A2 6/2003

OTHER PUBLICATIONS

European Search Report dated Jul. 11, 2008, issued in corresponding Application No. EP 08102259.2, filed Mar. 4, 2008.
Villatoro, J., et al., "Fabrication and Modeling of Uniform-Waist Single-Mode Tapered Optical Fiber Sensors," Applied Optics 42(13):2278-2283, 2003.

* cited by examiner

*Primary Examiner*—Gregory J Toatley, Jr.
*Assistant Examiner*—Iyabo S Alli
(74) *Attorney, Agent, or Firm*—Christensen O'Connor Johnson Kindness PLLC

(57) ABSTRACT

A fiber interface configuration for a chromatic point sensor optical pen is provided wherein a detector aperture element provides an aperture that is smaller than the light-transmitting core diameter of an optical fiber that is connected to the optical pen. The detector aperture element is fixed relative to the chromatically dispersive optics of the optical pen, the optical fiber abuts the aperture element, and the optical fiber core is aligned to the aperture. The aperture element and the end of the fiber may be inclined relative to the axis of the fiber, to deflect spurious reflections away from the optical signal path. The configuration provides high measuring resolution without using a tapered optical fiber, and provides interchangeability of the optical fiber connected to the optical pen.

19 Claims, 6 Drawing Sheets

CHROMATIC CONFOCAL SENSOR FIBER INTERFACE

FIELD OF THE INVENTION

The invention relates generally to precision measurement instruments, and more particularly to a fiber interface configuration for a point sensor such as may be utilized in an optical pen for chromatic confocal range sensing.

BACKGROUND OF THE INVENTION

Confocal techniques are known for measuring distances. As described in U.S. Pat. No. 5,785,651, it is known to utilize confocal microscopy as an effective means of obtaining high resolution images in both lateral dimension and in depth. In typical confocal microscopy, a monochromatic point source of light is projected onto a surface and a portion of the reflected light is separated and then imaged onto a detector pinhole. The amount of light through the pinhole is measured by a detector. The intensity of the light at the pinhole is diminished for out of focus targets. Therefore, the total light energy reaching the detector is inversely related to the distance a target is from the plane of best focus. This signal can be used to control the position of the microscope until a maximum signal is returned. The position of the microscope can then be recorded and correlated to the height of the object.

It is also known to use chromatic confocal techniques in optical height sensors. As described in U.S. Patent Application Publication No. US2006/0109483 A1, which is hereby incorporated herein by reference in its entirety, an optical element having axial chromatic aberration, also referred to as axial or longitudinal chromatic dispersion, may be used to focus a broadband light source such that the axial distance to the focus varies with the wavelength. Thus, only one wavelength will be precisely focused on a surface, and the height of the surface determines which wavelength is best focused. Upon reflection from the surface, the light is refocused onto a small detector aperture, such as a pinhole or the end of an optical fiber. In one embodiment, a 50 micron core fiber is utilized as both the source and receiver pinhole (the end of the fiber acting as the pinhole). Upon reflection from a surface and passing back through the optical system to the in/out fiber, only the wavelength that is well-focused on the surface is well-focused on the fiber. All of the other wavelengths are poorly focused on the fiber, and so will not couple much power into the fiber. Therefore, the signal level will be greatest for the wavelength corresponding to the height of the object. A spectrometer at the detector measures the signal level for each wavelength, which effectively indicates the height of the object.

Certain manufacturers refer to a practical and compact optical assembly that is suitable for chromatic confocal ranging in an industrial setting as a chromatic point sensor (CPS) and/or as an "optical pen". In such CPS optical pens, the standard design approach has been to use the end of the in/out fiber as the detector aperture. To provide a smaller detector aperture, which generally increases the measurement resolution, the standard technique is to taper the diameter of the fiber and core at its end. For example, certain manufacturers are known to have tapered the end of a 50 micron diameter core fiber to a 20 micron diameter core by a heating and stretching process (e.g. see J. Villatoro et al., "Fabrication and modeling of uniform-waist single mode tapered optical fiber sensors," Appl. Opt., 42, 2278-2283 (2003)). However, a number of problems or deficiencies have emerged in relation to existing CPS optical pen assemblies that are available for chromatic confocal range sensing. For example, one major problem is that, in order to maintain their specified performance the existing types of CPS optical pen assemblies generally require recalibration and/or factory servicing if the optical fiber needs to be replaced. This is both inconvenient and expensive for users.

The present invention is directed to providing an apparatus that overcomes the foregoing and other disadvantages. More specifically, an optical fiber interface configuration is provided for a CPS optical pen which increases resolution without requiring a tapered fiber, and provides other advantages.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A chromatic confocal sensor fiber interface configuration is provided for a compact CPS optical pen. It order to appreciate the value of the design features disclosed herein, it is essential to appreciate that the types of optical pens that are the subject of this invention, are exquisitely sensitive, providing surface height measurement resolution on the order of nanometers. This extraordinary measurement performance is, in turn, exquisitely sensitive to the exact construction of the optical pen. Measuring performance is altered and/or degraded with the smallest variations in the optical pen configuration. In this context, a fiber interface configuration according to this invention provides several advantages over the standard tapered fiber approach that is generally used to improve the measuring resolution of an optical pen.

The terms light and radiation are generally used interchangeably herein. Accordingly, it will be understood that the term light may include radiation outside the visible spectrum, if such radiation is used in a CPS optical pen.

In accordance with one aspect of the invention, a detector aperture element provides an aperture that is smaller than the light-transmitting core diameter of an optical fiber that is connected to the optical pen. The detector aperture element is fixed at an aperture operating position relative to the chromatically dispersive optics portion of the optical pen. In various embodiments, in operation, an inner diameter $D2$ of the aperture may generally fall within a projection of an outer diameter $D1$ of a light-transmitting core of the optical fiber along the direction of the fiber axis. In various embodiments, the optical fiber abuts the aperture element, and the optical fiber core is aligned to the aperture. In one specific example implementation, an optical fiber having a 50 micron core is aligned to, and abuts, a 20 micron aperture.

By fixing the detector aperture element relative to the chromatically dispersive optics portion of the optical pen, and making the aperture smaller than the optical core diameter, it becomes practical to interchange optical fibers using standard optical fiber connector tolerances, without substantially altering the performance of the optical pen. In contrast, the standard optical pen approach of directly using the end of a tapered fiber as the detector aperture virtually prevents interchangeability, due to variations in the properties and positioning of the tapered ends that are impractical or impossible to control at the required level. Furthermore, relevant properties of the aperture (e.g. its exact size, generation of spurious reflections or scattering, etc.) can be more easily and reliably controlled in the aperture element during manufacturing, in comparison to the corresponding properties of a tapered fiber end. This improved level of control reduces performance variations between different optical pens and simplifies their assembly and manufacturing.

In accordance with other features of the invention, the CPS optical pen is operable to provide a signal usable to measure a distance to a surface. In one embodiment, the CPS optical pen includes a housing, an optical element portion, and a fiber optic interface sub-assembly. The optical element portion provides a longitudinal chromatic dispersion for radiation emitted from the CPS optical pen, and receives radiation reflected from a surface. The fiber optic interface sub-assembly is fixed relative to the optical element portion and includes a mounting element and an aperture element, and receives an optical fiber. The optical fiber end may be positioned within the fiber optic interface sub-assembly, and the end of the fiber may be inclined at an angle (e.g. 7°) relative to a plane that is normal to a central axis of the fiber, so that reflections off of the fiber end face are directed away from the optical signal path. The end of the fiber is positioned proximate to the aperture element, which includes an aperture with a smaller diameter than that of the optical fiber core (e.g. a 20 micron aperture for a 50 micron fiber core). A surface of the aperture element may be inclined such that it is approximately parallel to the angle at the end of the fiber.

In accordance with another aspect of the invention, in one embodiment the optical fiber is encased in a ferrule with an angled end that it is approximately parallel to the angle at the end of the fiber. More specifically, in one specific example embodiment, a 50 micron FC/APC fiber is terminated by a ceramic ferrule which has a 7° angled end, and the face of the ferrule and the end of the APC fiber are designed to be flush.

In accordance with another aspect of the invention, the aperture element is constructed so as to reduce the backscattering of radiation into the fiber core. In one specific example implementation, the aperture element is a pinhole mask formed in 302 stainless steel that has a black copper oxide finish. In another embodiment, the aperture element has a glass substrate which is coated by a dark chrome thin film that includes the aperture.

In accordance with another aspect of the invention, in one embodiment prior to fixing the fiber optic interface sub-assembly relative to the optical element portion, the aperture is actively aligned. According to one aspect of one exemplary alignment procedure, an optical fiber is positioned in a nominal operating position in the fiber optic interface sub-assembly, which may include positioning the end of the optical fiber against the aperture element in approximate alignment with the aperture. The end of the optical fiber is then illuminated through the aperture using narrowband radiation (e.g. from a HeNe laser), and the power coupled through aperture at the narrowband radiation wavelength (e.g. 633 nm) is measured with a spectrometer (e.g. the spectrometer normally used with the CPS optical pen). The aperture position may then be adjusted until the best spectrometer signal is obtained, and the aperture may then be fixed in position relative to the fiber optic interface sub-assembly. The relationship between the fiber optic interface sub-assembly and the optical portion may then be adjusted under controlled operating conditions using broadband illumination such that the characteristics of the spectrometer signal are approximately optimized.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
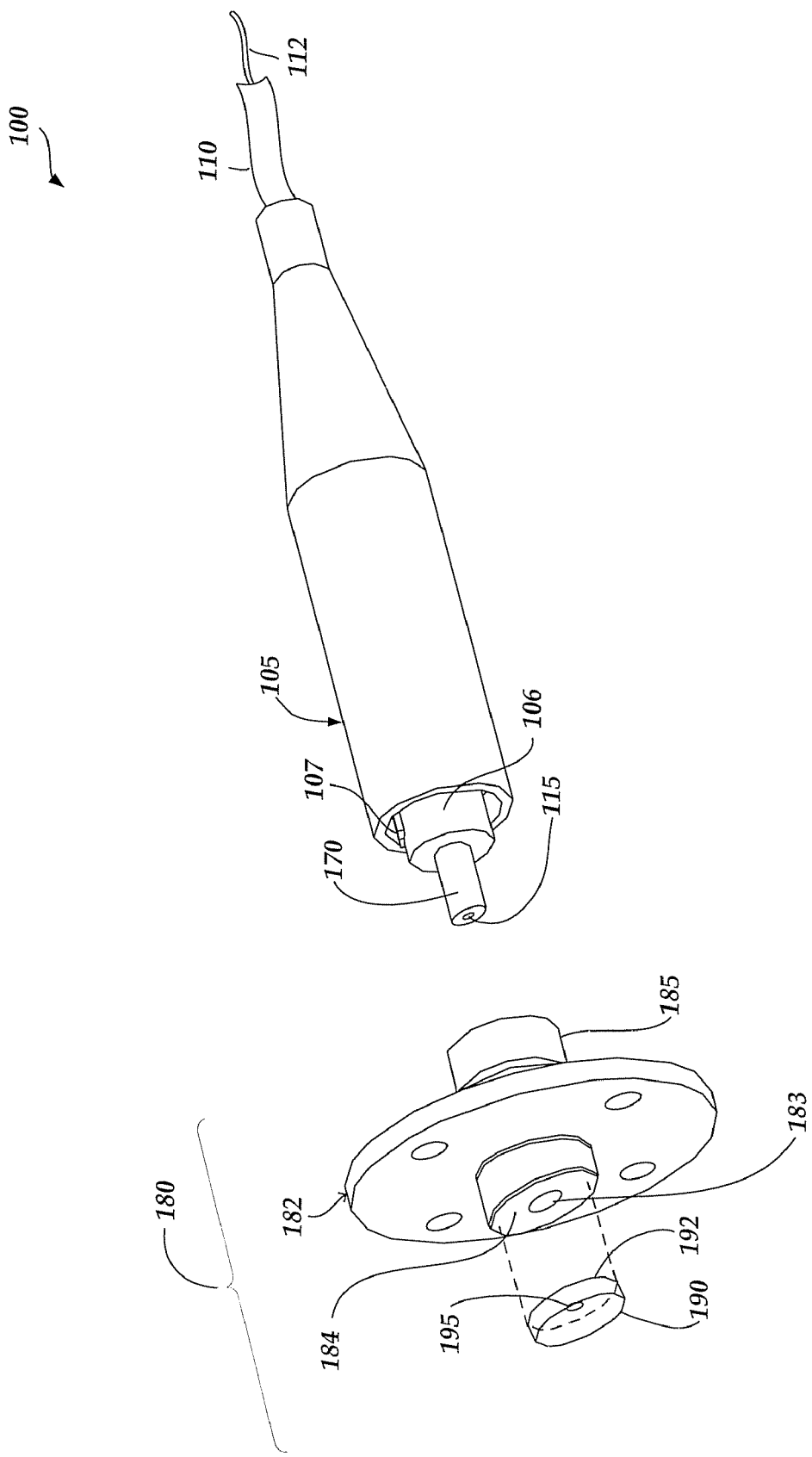
FIG. 1 is a diagram of an isometric view of a first exemplary embodiment of a CPS optical pen fiber interface configuration including a fiber interface subassembly.

FIG. 1 is a diagram of an isometric view of a first exemplary embodiment of a CPS optical pen fiber interface configuration 100 that includes a fiber interface subassembly 180 comprising a mounting element 182 and an aperture element 190. Also shown in FIG. 1, an optical fiber cable 110 including an optical fiber 112 with a core and cladding is positioned in an FC/APC connector 105. The connector 105 includes a plug element 106 with a rotational alignment key 107. The plug element 106 surrounds a ferrule 170 which encases the optical fiber 112. The optical fiber end 115 of the optical fiber 112 is exposed at the end of the ferrule 170. In one embodiment, the ferrule 170 may be ceramic. During operation, the fiber interface subassembly 180 receives the ferrule 170 and the optical-fiber end 115, as the plug element 106 is received by a receiving portion 185 of the mounting element 182.

As will be described in more detail below, in one embodiment the mounting element 182 has an angled end surface 184 (e.g. 7° relative to the fiber or ferrule axis). An aperture element 190 is attached to the angled end surface 184. The aperture element 190 includes an aperture 195 which is aligned with the fiber end 115. In one embodiment, the aperture 195 is formed in a non-reflective thin film (e.g. dark chrome) that is deposited on a transparent aperture element 190. The attachment of the aperture element 190 to the angled end surface 184 will be described in more detail below with respect to FIG. 2. The end of ferrule 170 and the fiber end 115 are also angled (e.g. 7° relative to a plane that is normal to the fiber or ferrule axis), and the rotational alignment key 107 of the plug 106 and a mating feature (not shown) in the receiving portion 185 are designed to ensure the proper rotational alignment, such that the angled fiber end 115 and end of the ferrule 170 are parallel to the angled surface of the aperture element 190 proximate to angled surface 184 in operation. The angled surfaces help ensure that spurious reflections off of the fiber end 115 or the aperture element 190, or other elements, is directed away from the optical signal path, that is, away from the core of the optical fiber 112. In one specific implementation, the optical fiber 112 is an APC fiber and the connector 105 is an FC/APC connector.

As will be described in more detail below with respect to FIG. 2, a core 116 of the optical fiber 112 has a diameter D1 (e.g. 50 microns), while the aperture 195 has a smaller diameter D2 (e.g. 20 microns). In this configuration the aperture 195 governs both the lateral and axial resolution of the CPS optical pen, and provides several advantages in comparison to the tapered fiber approach that is conventionally used to increase the resolution in CPS optical pens. As previously outlined, such advantages include more consistent performance between optical pens and optical fiber interchangeability without recalibration. Regarding the tapered fiber approach, tapering is typically difficult to control and the end of the fiber core will often vary by a few microns from the intended size. In addition, in practice, the actual illumination spot size that is produced by the end of a tapered fiber may be larger than one would expect from an "ideal" fiber end. For example, the inventor has observed that for a 20 micron end diameter of a tapered core the resulting spot near the fiber end may have a diameter of up to 35 microns and soft edges, and will vary from fiber to fiber.

Figure 2:
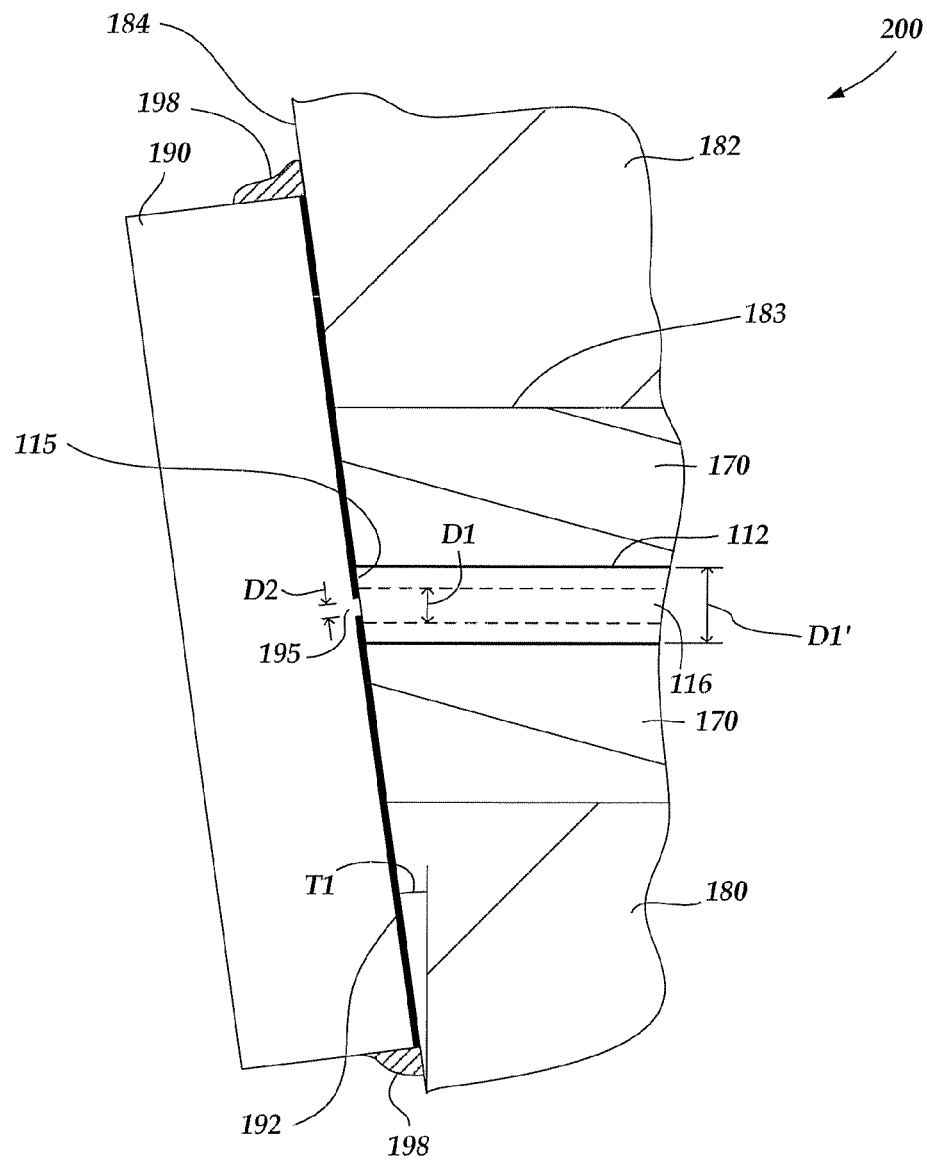
FIG. 2 is a diagram of a side view cross-section of a portion of the fiber optic interface subassembly of FIG. 1 during operation.

FIG. 2 is a diagram 200 of a side view cross-section of a portion of the fiber interface configuration 100 of FIG. 1, during operation. As shown in FIG. 2, the optical fiber 112 is encased by the ferrule 170, which in turn is received in a hole 183 through the mounting element 182. The hole 183 and the ferrule 170 may be constructed so that the optical fiber 112 is centered to a high degree of precision in the hole 183. In various embodiments, in operation, the ferrule 170 and the optical fiber 112 are received and constrained in the hole 183 with an axis of the optical fiber 112 approximately coinciding with the axis of the hole 183. The fiber end 115 and the end of the ferrule 170 may be flush with each other and are beveled to an angle T1 (e.g. 7°) relative to a plane that is normal to the fiber axis. The aperture element 190 with the opaque thin film 192 is fixed to the angled surface 184 by conventional means (e.g. glue fillets 198.) The thin film 192 covers the fiber end 115 except for the aperture 195, which is aligned with the fiber core 116. The optical fiber 112 has an outer diameter D1', while the optical fiber core 116 has an outer diameter D1, and the aperture 195 has an inner diameter D2. In various embodiments the optical fiber end 115 is positioned proximate to the aperture 195, and aligned with the aperture 195 at least well enough such that the inner diameter D2 of the aperture falls within a projection of the outer diameter D1' of the optical fiber along the direction of the fiber axis. In various preferred embodiments, the optical fiber end 115 is aligned with the aperture 195 at least well enough such that the inner diameter D2 of the aperture 195 falls within a projection of the outer diameter D1 of the core 116 along the direction of the fiber axis, and is further actively aligned to optimize the measurement signals of the CPS optical pen, as described in greater detail below.

In one specific example embodiment, for a commercially available optical fiber 112 with an outer diameter D1' of 125 microns and a core diameter D1 of 50 microns, the inner diameter D2 of the aperture 195 is made to be 20 microns. However, in various embodiments a smaller or larger dimension may be chosen for the aperture diameter D2 (e.g. 35 microns). As will be described in more detail below, smaller diameters tend to provide higher resolution and lower signal (which may increase the signal acquisition time), and larger diameters tend to provide the opposite characteristics. As previously mentioned, the angled surface 184, the aperture element 190, and the fiber end 115 are angled at the angle T1 (e.g. 7°) so that spurious reflections are deflected out of the optical signal path through the fiber core 116 (e.g. into the cladding layer or surrounding environment). In various embodiments, the ferrule 170 is spring-loaded in the FC/APC connector 105 (shown in FIG. 1), and the angled surface 184 is located such that the spring-loading forces the fiber end 115 and/or the ferrule 170 to abut the surface of the aperture element 190 in the region surrounding the aperture 195. This further reduces or eliminates potential spurious reflections from the optical signal path and ensures that the light received through the aperture 195 enters the core 116 to provide the maximum signal. However, in various embodiments, the fiber end may be recessed by a slight amount proximate to the surface surrounding the aperture 195 (e.g. on the order of the core diameter), and adequate performance may still result.

In one embodiment, the aperture 195 is actively aligned relative to a nominal operating position of the fiber end 115 and the core 116. According to one exemplary embodiment of an alignment procedure, an optical fiber 112 is positioned in a nominal operating position in the mounting element 182, which may include positioning the fiber end 115 against the aperture element 190 in approximate alignment with the aperture 195. The fiber end 115 is then illuminated through the aperture 195 using narrowband radiation (e.g. from a HeNe laser), and the power coupled into the core 116 through aperture 195 at the narrowband radiation wavelength (e.g. 633 nm) is measured with a spectrometer (e.g. the spectrometer normally used with the CPS optical pen). The aperture position may then be adjusted until the best spectrometer signal is obtained, and the aperture element 190 may then be fixed in position relative to the mounting element 182. In some embodiments, the alignment procedure may also include simultaneously projecting broadband radiation through the optical fiber 112 (e.g. using the broadband source normally used with the CPS optical pen), such that aperture element 190 backscatters the broadband radiation in the same manner that it would during normal operation. In such a case, the best spectrometer signal is the one that provides approximately the best signal to noise ratio between the narrowband radiation spectral peak and the broadband radiation spectral background.

In another embodiment, the thin film 192 may include alignment features or patterns (e.g. transparent annuli) that are nominally concentric with the aperture 195, and that nominally coincide with the diameter of the hole 183. The features may all be at a diameter substantially larger than the fiber diameter D1', such that they do not have the possibility of transmitting signal light. The aperture element 190 may then be aligned with the hole 183 under a microscope and bonded in place to the angled surface 184, such that the alignment features are concentric with the hole 183 within a few microns. This will ensure approximately the same concentricity for the aperture 195 relative to the ferrule 170 and fiber end 115 that are received in the hole 183 during operation. While this visual alignment procedure may be sufficient for some applications, it should be appreciated the active alignment procedure outlined previously is generally preferred in order to provide the best measurement performance in critical applications.

Figure 3:
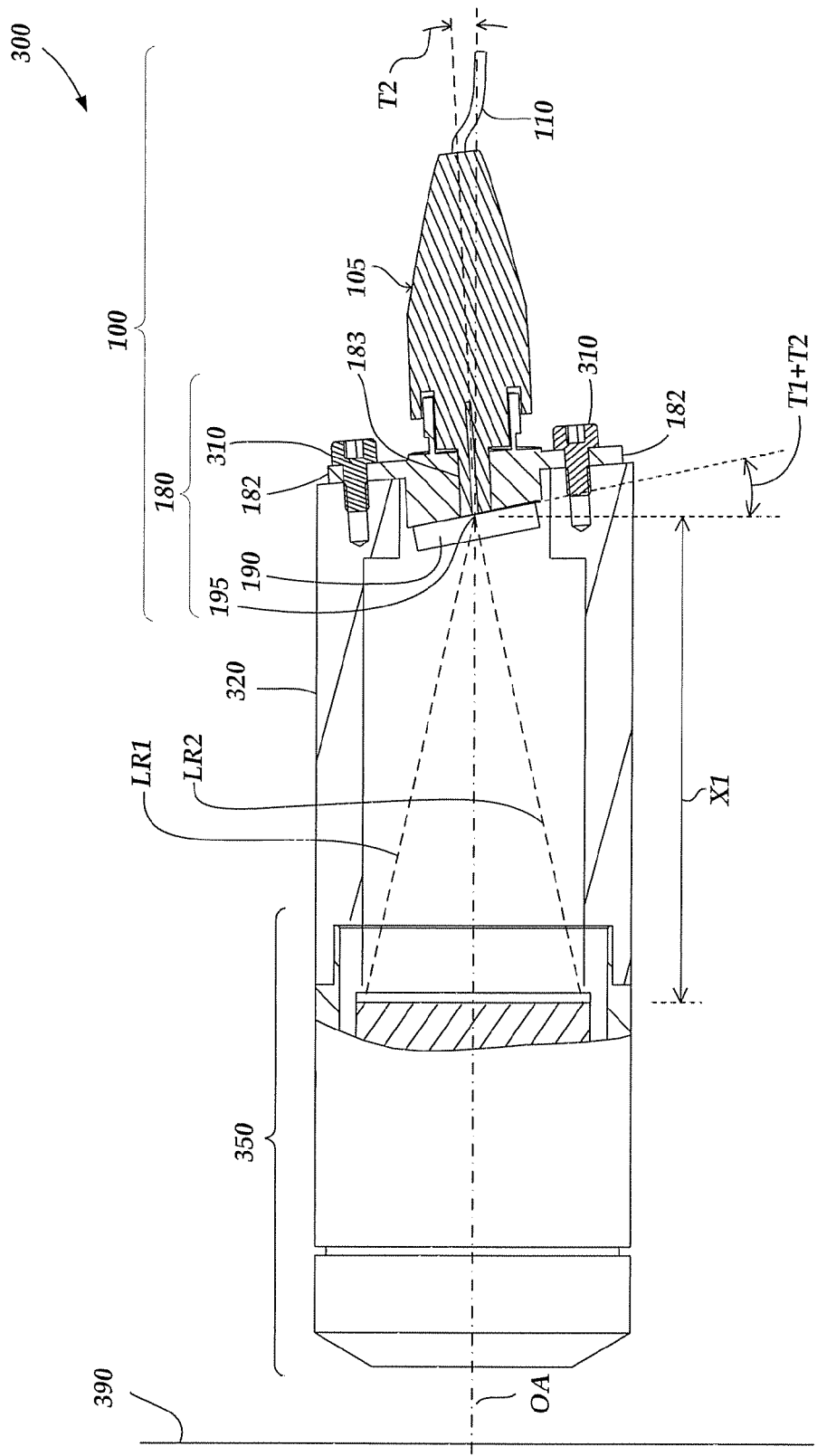
FIG. 3 is a diagram of a side view cross-section of a CPS optical pen including the fiber interface configuration of FIG. 1.

FIG. 3 is a diagram of a side view cross-section of a first embodiment of a CPS optical pen 300 including the fiber interface configuration 100 of FIG. 1. As shown in FIG. 3, the CPS optical pen 300 also includes an optical pen assembly housing 320 and an optics portion 350. In operation, light emitted from the fiber end 115 through the aperture 195 is focused by the optics portion 350, which includes a lens that provides an axial chromatic dispersion such that the focal point along the optical axis OA is at different distances depending on the wavelength of the light, as is known for chromatic confocal sensor systems. The light is focused on a workpiece surface 390. Upon reflection from the workpiece surface 390, the light is refocused by the optics portion 350 onto the aperture 195 as illustrated by the limiting rays LR1 and LR2. A distance X1 represents the spacing between the rear principal plane of the optics portion 350 and the aperture 195. Due to the axial chromatic dispersion, only one wavelength will be in focus at the surface 390, and the distance from the optical pen 300 to the surface 390 determines which wavelength is best focused. The wavelength that is best focused at the surface 390 will also be the wavelength that is best focused at the aperture 195. Therefore, the light received into the core 116 of the optical fiber cable 110 through aperture 195 will be spatially filtered to have predominantly the best focused wavelength. In various embodiments, the optical fiber cable 110 routes the signal light to a spectrometer (not shown) that is utilized for determining the wavelength corresponding to the highest signal level, thus determining the distance to the workpiece surface 390.

The mounting element 182 of the sub-assembly 100 may be attached to the end of the optical pen assembly housing 320 using mounting screws 310. In various embodiments, the mounting element 182 is mounted such that the axis of the hole 183 is at an angle T2 relative to the optical axis OA. The angle T2 is chosen such that the angle (T1+T2) is approximately the same as the angle of refraction for light at the surface of the aperture element 190 (e.g. approximately 11° for a fiber end bevel angle of 7° and a glass aperture element), so that light rays parallel to the fiber axis are bent parallel to the optical axis OA as they exit the aperture element 190.

In various embodiments, prior to finally tightening the screws 310 and thereby fixing the fiber optic interface sub-assembly 180 relative to the optical element portion 350, it is actively aligned to the optical portion 350. The relationship between the fiber optic interface sub-assembly 180 and the optical portion 350 may generally be adjusted under controlled operating conditions using broadband illumination (e.g. as used during normal operation) such that the characteristics of the resulting spectrometer signals are approximately optimized. The relationship may be adjusted using any combination of the axial location and/or tilt of optical portion 350 and the axial and lateral position of the fiber optic interface sub-assembly 180. In one embodiment, adjustments are made until one or more respective spectral peaks associated with respective measurement distances to a selected surface (e.g. a mirror) exhibit a desirable combination of maximum height and minimum width, so that their peak locations may be estimated with the best accuracy. The aperture 195 is then fixed at the final aperture operating position relative to the optical portion 350, by fixing the optical portion 350 relative to the housing 320 (if necessary) and fully tightening the screws 310.

Figure 4:
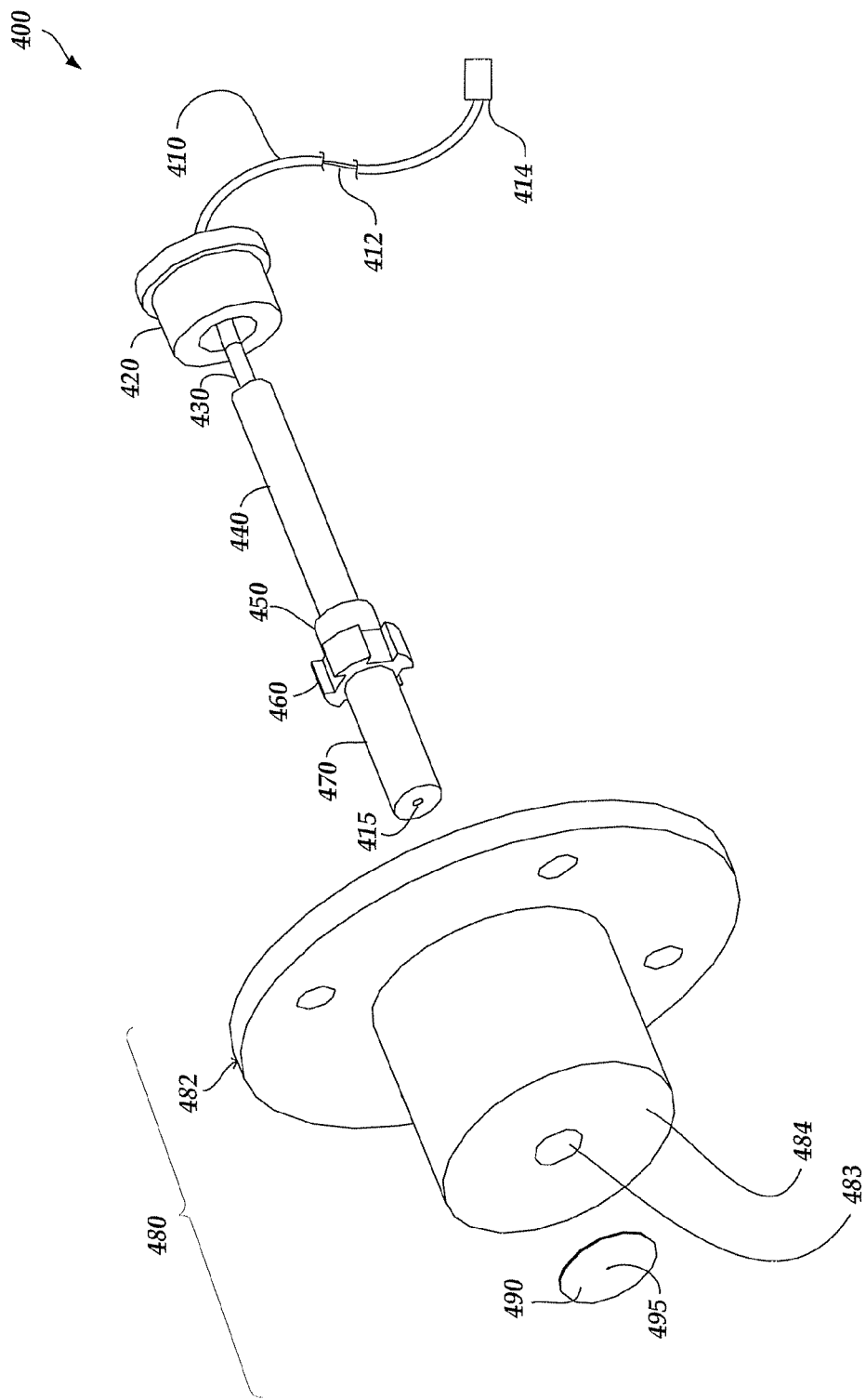
FIG. 4 is a diagram of an isometric view of a second exemplary embodiment of a CPS optical pen fiber interface configuration including a fiber optic interface subassembly.

FIG. 4 is a diagram of an isometric view of a second exemplary embodiment of a CPS optical pen fiber interface configuration 400. The components of the CPS optical pen fiber interface configuration 400 are similar to those of the CPS optical pen fiber interface configuration 100 of FIG. 1, and 4XX series numbers in FIG. 4 that have the same "XX" suffix as 1XX series numbers in FIG. 1 may designate similar or identical elements, which may function similarly, except as otherwise described or implied below. The CPS optical pen fiber interface configuration 400 includes a fiber interface subassembly 480 comprising a mounting element 482 and an aperture element 490. Also shown in FIG. 4, is an optical fiber cable 410 including an internal optical fiber 412. The optical fiber cable 410 may terminate in a suitable commercially available optical fiber connector 414. A strain relief element 430 may couple a portion of the fiber cable 410 to a rear ferrule 440. In one embodiment, the rear ferrule 440 may comprise a sleeve having an intermediate portion 450 that has a different diameter then the remainder of the rear ferrule 440. During assembly, the optical fiber cable 410 may be inserted through the rear ferrule 440 and a bare portion of the optical cable 412 may continue through a front ferrule 470, with a fiber end 415 exposed at the end of the front ferrule 470. The front ferrule 470 may be bonded to an intermediate portion 450. In one embodiment, the ferrule 470 may be ceramic and may include a rotational alignment portion 460. A hole 483 in the mounting element 482 receives the front ferrule 470 and the optical-fiber end 415, and internal features in the hole may mate with the rotational alignment portion 460 to insure its proper alignment. A retaining element 420 may slide forward to press the rotational alignment portion 460 forward against an axial stop (e.g. an internal shoulder in the hole 483), and the retaining element 420 may be bonded or compression fit into a rear portion of the hole 483 that has a matching diameter. In various embodiments, the ferrule 470 may be ceramic, may be merged with or indistinguishable from the intermediate portion 450 and/or the rear ferrule 440.

In various embodiments, the end of the ferrule 470, the fiber end 415 and an angled surface 484 of the mounting element 482 may all be angled relative to the fiber axis and the axis of the hole 483 as previously outlined for the elements 170, 115 and 184. In the embodiment shown in FIG. 4, internal features (not shown) in the hole 483 may mate with the rotational alignment portion 460 to insure their proper rotational alignment, such that the angled fiber end 415 and end of the ferrule 470 are parallel to the angled surface of the aperture element 490 proximate to the angled surface 484 in operation. In alternative embodiments, proper rotational alignment may be achieved by any other convenient means. It will be appreciated that one embodiment, the interior of the hole 483 may be configured similarly to the interior of the holes through the ferrule 470 and the rear ferrule 440, and the fiber 412 may be received and positioned directly in such a hole in the mounting element 482. In such an embodiment, the elements 470, 460, 450 and 440 may be omitted.

In any case, an aperture element 490 is attached to the angled end surface 484, and includes an aperture 495 which is aligned with the fiber end 415. The aperture element 490 may be an opaque material that includes a pinhole aperture. In one specific example embodiment, the aperture element 490 may be formed from 302 stainless steel and have a black copper oxide finish on both sides to reduce spurious reflections of light into the optical signal path. The attachment of the aperture element 490 to the angled end surface 484 will be described in more detail below with respect to FIG. 5.

Figure 5:
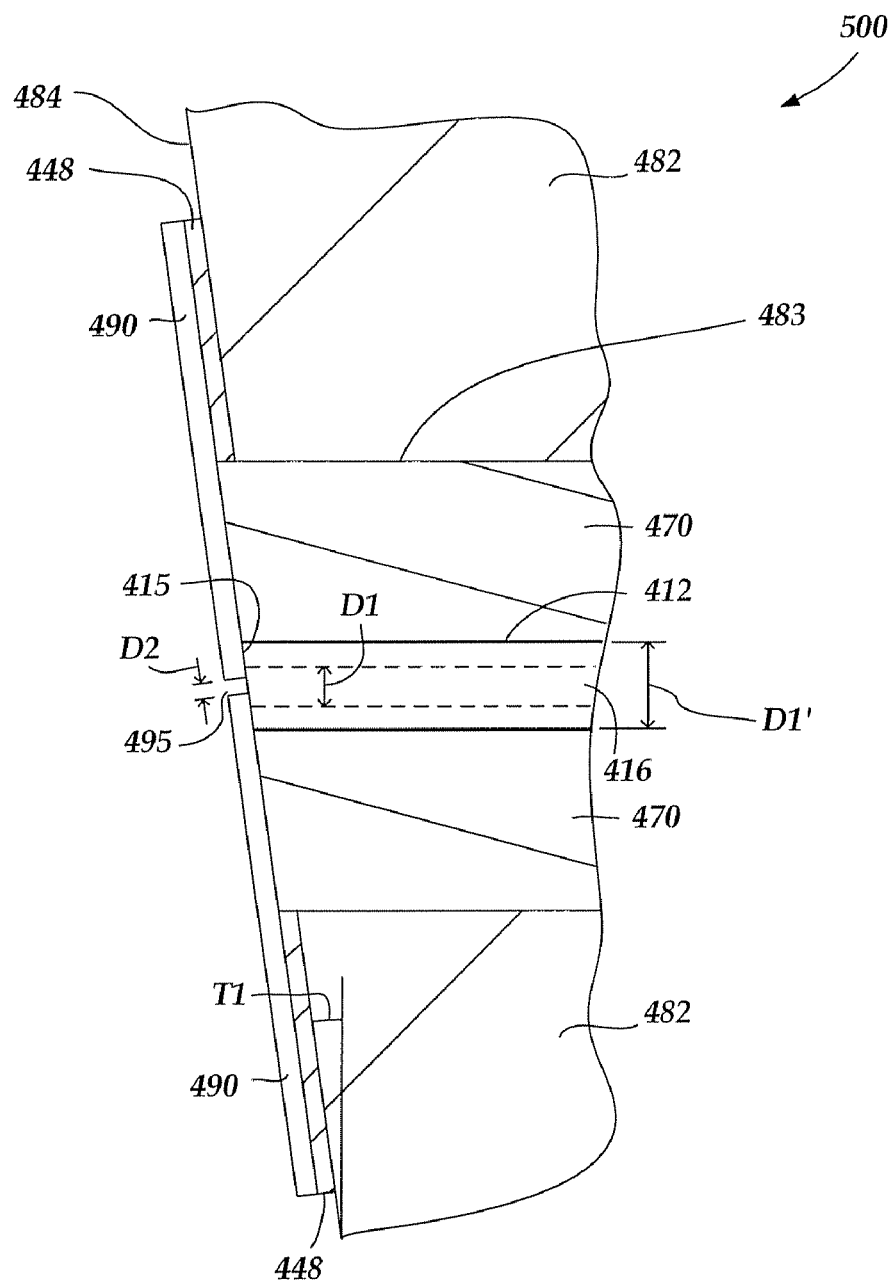
FIG. 5 is a diagram of a side view cross-section of a portion of the fiber optic interface subassembly of FIG. 4 during operation.

FIG. 5 is a diagram 500 of a side view cross-section of a portion of the fiber interface configuration 400 of FIG. 4, during operation. As shown in FIG. 5, the optical fiber 412 is encased by the front ferrule 470 which in turn is received in the hole 483. In various embodiments the ferrule 470 and the optical fiber 412 are received and constrained in the hole 483 with an axis of the optical fiber 412 approximately coinciding with the axis of the hole 483. The fiber end 415 and the end of the ferrule 470 may be flush with each other at the angle T1. The aperture element 490 may abut and cover the fiber end 415 and may also abut and cover the end of the ferrule 470 as shown. The aperture element 490 may be fixed to the angled surface 484 by conventional means (e.g. glue lines 448), with the aperture approximately concentric to the hole 483 and/or the fiber core 416. In various embodiments, the aperture 495 may be aligned relative to the position of the fiber end 415 and the core 416 using alignment procedures similar or identical to those outlined above with reference to FIG. 2. The dimensions D1 and D2 may be similar to those discussed above with respect to FIG. 2.

In one specific example embodiment, the fiber end 415, the end of the ferrule 470 and/or the angled surface 484 may all be polished flush after the components are assembled together. For example, in the initial assembly, the fiber end 415 and/or the ferrule 470 may be inserted so that the ends extend slightly beyond the surface of the mounting element 480. Thereafter, a polishing operation could be performed to bring the surfaces flush. In such an embodiment, it may be advantageous for the aperture element 490 to abut the flush surfaces and be bonded around its edges with a glue fillet or spot welded to the mounting element 482.

Figure 6:
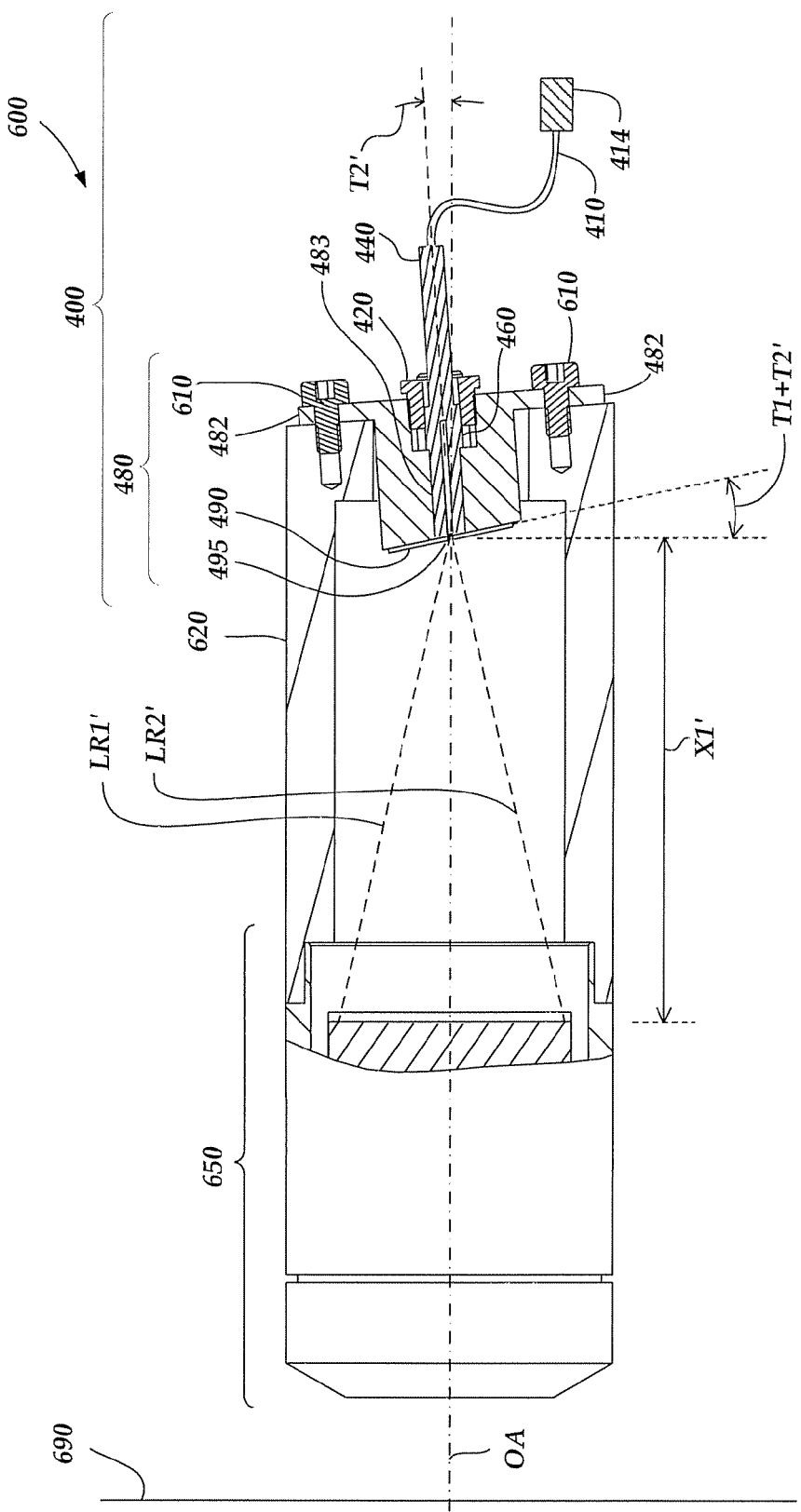
FIG. 6 is a diagram of a side view cross-section of a CPS optical pen including the fiber interface configuration of FIG. 4.

FIG. 6 is a diagram of a side view cross-section of a second embodiment of a CPS optical pen 600 including the fiber interface configuration 400 of FIG. 4. As shown in FIG. 6, the CPS optical pen 600 also includes an optical pen assembly housing 620, and an optics portion 650, which may be similar or identical to the optics portion 350 described with reference to FIG. 3. In operation, light emitted from the fiber end 415 through the aperture 495 is focused by the optics portion 650. The light is focused on the workpiece surface 690 with axial chromatic dispersion, reflected, and refocused by the optics portion 650 on to the aperture 495 as illustrated by the limiting rays LR1' and LR2'. A distance X1' represents the spacing between the rear principal plane of the optics portion 650 and the aperture 495. Due to the axial chromatic dispersion, only one wavelength will be in focus at the surface 690 and the same wavelength will focus at the aperture 495. Therefore, light received into the core 416 of the optical fiber cable 410 through the aperture 495 will be spatially filtered to have predominantly the best focused wavelength. In various embodiments, the optical fiber cable 410 routes the signal light to an optical fiber attached to the connecter 414, which in turn carries the signal to a spectrometer (not shown) that is utilized for determining the wavelength corresponding to the highest signal level, thus determining the distance to the workpiece surface 690.

The mounting element 482 of the sub-assembly 400 may be attached to the end of the CPS optical pen assembly housing 620 using mounting screws 610. In various embodiments, the mounting element 482 is mounted such the axis of the hole 483 is at an angle T2' relative to the optical axis OA. The angle T2' is chosen such that the angle (T1+T2') is approximately the same as the angle of refraction for light at the fiber end 490 (e.g. approximately 11° for a fiber end bevel angle of 7°), so that light rays parallel to the fiber axis are bent parallel to the optical axis OA as they exit the fiber end 490.

In various embodiments, prior to finally tightening the screws 610 and thereby fixing the fiber optic interface sub-assembly 480 relative to the optical element portion 650, it is actively aligned to the optical portion 650. The fiber optic interface sub-assembly 480 may be actively aligned relative to the optical element portion 650 using alignment procedures similar or identical to those outlined above with reference to FIG. 3. The aperture 495 is then fixed at the final aperture operating position relative to the optical portion 650 by fixing the optical portion 650 relative to the housing 620 (if necessary) and fully tightening the screws 610.

In practice, CPS optical pens fabricated according to above principles have exhibited superior lateral and axial measurement resolution in comparison to conventional CPS optical pens fabricated using the tapered optical fiber end aperture, despite the fact that the apertures of the aperture elements and the tapered fiber end apertures appear to have the same diameter. While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A chromatic point sensor optical pen operable to provide a signal usable to measure a distance to a surface, the chromatic point sensor optical pen comprising:
   a housing;
   an optical element portion that provides longitudinal chromatic dispersion for radiation emitted from the chromatic point sensor optical pen, and that receives radiation reflected from the surface, the optical element portion defining an optical axis of the chromatic point sensor optical pen; and
   a fiber optic interface subassembly, comprising:
      a mounting element that is fixed relative to the housing, the mounting element including a hole configured to receive at least an optical fiber; and
      an aperture element that is fixed relative to the mounting element such that a surface of the aperture element is inclined at an angle T1 relative to a plane that is normal to an axis of the hole, the aperture element providing an aperture fixed at an aperture operating position relative to the optical element portion and proximate to a center of an end of the hole, the aperture having an inner diameter D2,
   wherein the fiber optic interface subassembly is configured such that, in operation, at least an optical fiber is received and constrained in the hole with an axis of the optical fiber approximately coinciding with the axis of the hole, and with an end of the optical fiber positioned proximate to the aperture and aligned with the aperture such that the inner diameter D2 of the aperture falls within a projection of an outer diameter D1' of the optical fiber along the direction of the fiber axis.

2. The chromatic point sensor optical pen of claim 1, wherein the inner diameter D2 of the aperture falls within a projection of an outer diameter D1 of a light-transmitting core of the optical fiber along the direction of the fiber axis.

3. The chromatic point sensor optical pen of claim 2, wherein D2 is less than 0.5*D1.

4. The chromatic point sensor optical pen of claim 2, wherein D1 is approximately 50 microns.

5. The chromatic point sensor optical pen of claim 1, wherein the angle T1 is at least 5° and at most 10°.

6. The chromatic point sensor optical pen of claim 1, wherein the end of the optical fiber is inclined at approximately the angle T1 relative to a plane that is normal to the axis of the optical fiber.

7. The chromatic point sensor optical pen of claim 6, wherein the end of the optical fiber is positioned approximately parallel to the surface of the aperture element and abuts the surface of the aperture element.

8. The chromatic point sensor optical pen of claim 6, wherein, in operation, an optical fiber encased in a ferrule is received and constrained in the hole.

9. The chromatic point sensor optical pen of claim 8, wherein the optical fiber encased in the ferrule comprise a portion of an interchangeable optical fiber connector.

10. The chromatic point sensor optical pen of claim 9, wherein the interchangeable optical fiber connector is an FC/APC connector.

11. The chromatic point sensor optical pen of claim 1, wherein the optical fiber is permanently received and constrained in the hole.

12. The chromatic point sensor optical pen of claim 11, wherein the optical fiber is encased in a ferrule that is received and permanently constrained in the hole.

13. The chromatic point sensor optical pen of claim 1, wherein the aperture element comprises a surface material selected to reduce the amount of unwanted light reflected into a light-carrying core of the optical fiber.

14. The chromatic point sensor optical pen of claim 1, wherein the aperture element comprises a transparent substrate with the aperture formed in a film applied to the surface of the transparent substrate.

15. The chromatic point sensor optical pen of claim 1, wherein the aperture element is a pinhole mask formed of metal.

16. A method for providing a signal usable to measure a distance to a surface, the method comprising:
    providing a chromatic point sensor optical pen comprising:
        a housing;
        an optical element portion that provides longitudinal chromatic dispersion for radiation emitted from the chromatic point sensor optical pen, and that receives radiation reflected from the surface, the optical element portion defining an optical axis of the chromatic point sensor optical pen; and
        a fiber optic interface subassembly, comprising:
            a mounting element that is fixed relative to the housing, the mounting element including a hole configured to receive at least an optical fiber;
            an aperture element that is fixed relative to the mounting element such that a surface of the aperture element is inclined at an angle T1 that is at least 5 degrees relative to a plane that is normal to an axis of the hole, the aperture element providing an aperture fixed at an aperture operating position relative to the optical element portion and proximate to a center of an end of the hole, the aperture having an inner diameter D2; and
            at least an optical fiber received and constrained in the hole with an axis of the optical fiber approximately coinciding with the axis of the hole, and with an end of the optical fiber positioned proximate to the aperture and aligned with the aperture such that the inner diameter D2 of the aperture falls within a projection of an outer diameter D1' of the optical fiber along the direction of the fiber axis;
    transmitting broadband radiation from the optical fiber end through the aperture to the optical element portion;
    transmitting the broadband radiation through the optical element portion and focusing the broadband radiation such that the focal point of the radiation along the optical axis is at different distances depending on the wavelength of the light;
    reflecting the focused broadband radiation from the surface and back through the optical element portion;
    refocusing the reflected broadband radiation proximate to the aperture, with axial chromatic dispersion, such that radiation transmitted through the aperture is predominantly of the wavelength that is best focused at the aperture; and
    inputting the radiation transmitted through the aperture to the end of the optical fiber in order to provide the signal that is usable to measure a distance to a surface.

17. The method of claim 16, wherein the inner diameter D2 of the aperture falls within a projection of an outer diameter D1 of a light-transmitting core of the optical fiber along the direction of the fiber axis.

18. The method of claim 17, wherein D2 is less than 0.5*D1.

19. The method of claim 17, wherein D1 is approximately 50 microns.

* * * * *